United States Patent [19]

Willett

[11] 4,367,724
[45] Jan. 11, 1983

[54] BAKER'S OVENS

[76] Inventor: Paul E. Willett, 43 Porter St., Redcliffe, Queensland 4020, Australia

[21] Appl. No.: 205,298

[22] Filed: Nov. 10, 1980

[30] Foreign Application Priority Data

Nov. 16, 1979 [AU] Australia .............................. PE1362
Jul. 15, 1980 [AU] Australia .............................. PE4523

[51] Int. Cl.³ ................................................ A21B 1/08
[52] U.S. Cl. ................................... 126/20; 126/369; 99/479; 99/443 R
[58] Field of Search ..................... 126/20, 369, 377; 34/186, 187; 99/352, 447, 443 R, 479, 467, 477

[56] References Cited

U.S. PATENT DOCUMENTS

| | | | |
|---|---|---|---|
| 1,009,414 | 11/1911 | Hérissé | 126/20 |
| 1,599,556 | 9/1926 | Cook | 99/443 R |
| 1,706,186 | 3/1929 | Sargent | 34/187 |
| 1,792,465 | 2/1931 | Petersen | 126/20 |
| 1,878,353 | 9/1932 | Watter | 126/20 |
| 2,817,286 | 12/1957 | Lisbon | 99/443 R |
| 2,831,954 | 4/1958 | Pirz | 126/20 |
| 3,820,524 | 6/1974 | Buckell | 126/20 |
| 3,992,984 | 11/1976 | Treiber | 126/20 |

FOREIGN PATENT DOCUMENTS

| | | | |
|---|---|---|---|
| 978633 | 4/1951 | France | 126/20 |
| 485738 | 1/1976 | U.S.S.R. | 99/443 R |

*Primary Examiner*—James C. Yeung
*Attorney, Agent, or Firm*—D. Paul Weaver

[57] ABSTRACT

A baker's oven of the type having an oven compartment with a loading door, and containing heating means and a horizontal support, rotatable about a vertical axis, for articles to be baked, has steaming means for producing steam within the oven compartment, such steaming means including a metal body in the upper part of the oven compartment and heated by the heating means, a passage in the body receiving, from any suitable source, water under pressure which is expelled in finely divided form through nozzles into the compartment, the nozzles being directed away from the doorway and in the direction of rotation of the rotary support.

6 Claims, 6 Drawing Figures

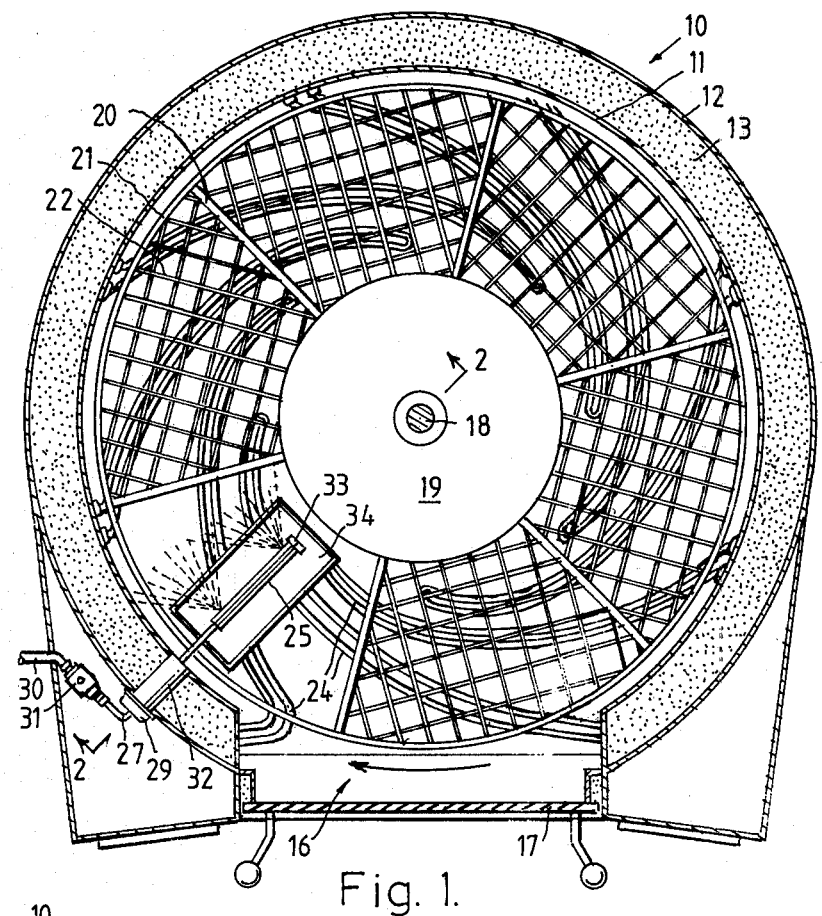
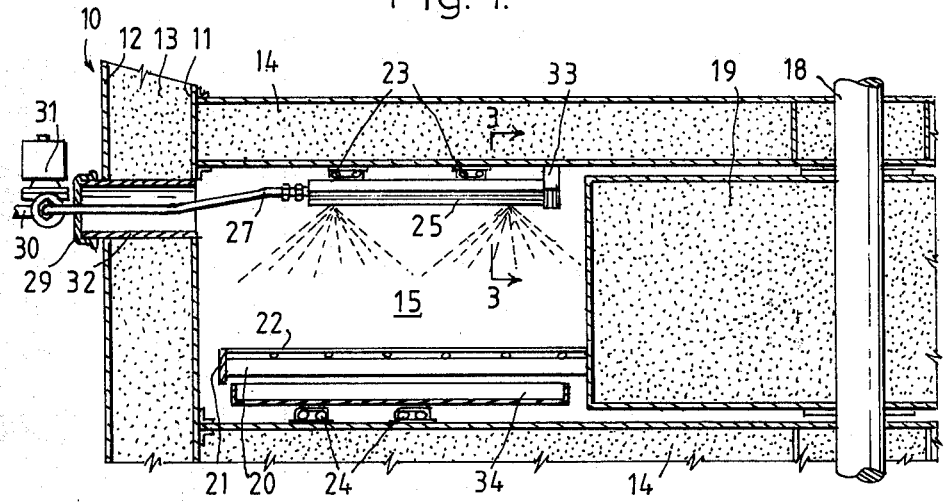

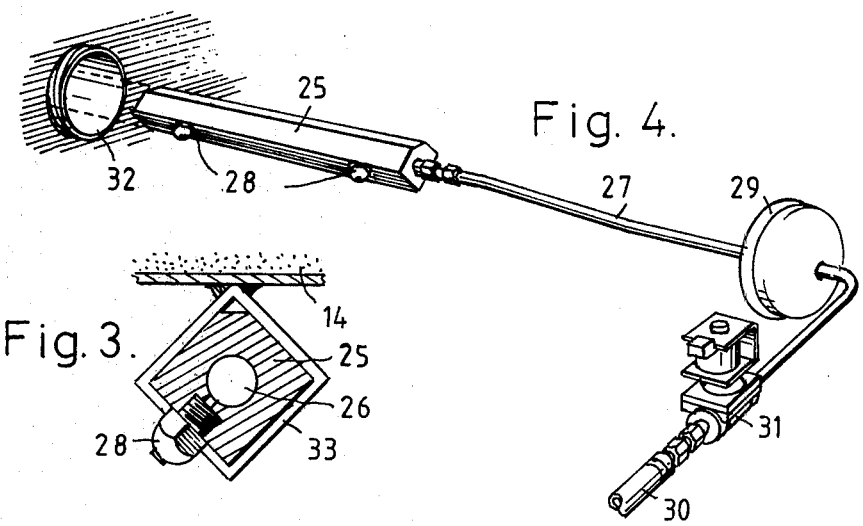
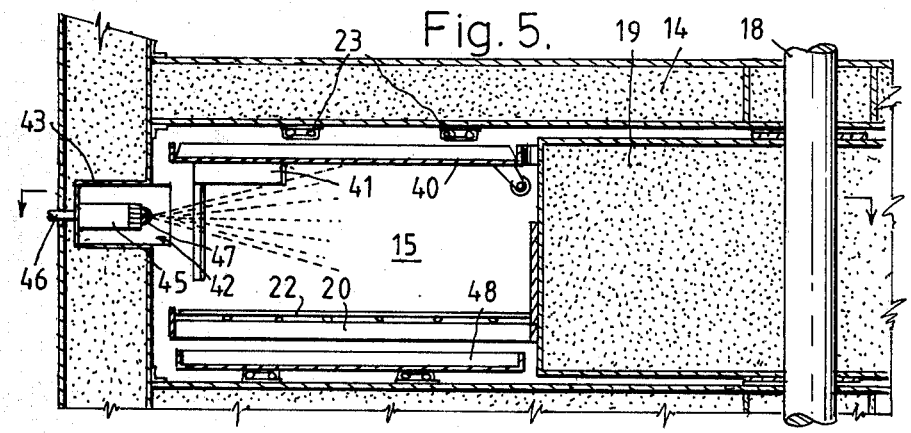
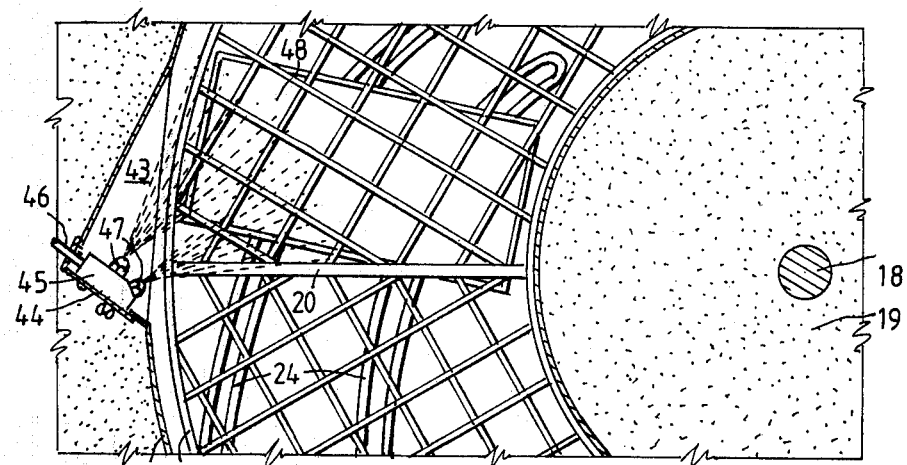

BAKER'S OVENS

BACKGROUND OF THE INVENTION

This invention relates to improvements in bakers' ovens.

It is well-known, in baking certain kinds of bread, to inject steam to the oven, which results in the crust being crisp and glazed. The base results are achieved if water vapour or mist is applied to the dough in the early stages of baking, and if there is a good deal of water vapour in the oven during the baking process. In a conventional baker's oven this is achieved normally by the injection of steam from a boiler into the oven. This involves a good deal of additional expense, in the provision of the boiling as an accessory to the oven, and moreover the steam-filled oven is likely to result in discomfort, and possible danger, to a baker unloading the oven.

The specification of my co-pending patent application Ser. No. 171262 describes and illustrates a baker's oven having a number of superimposed compartments insulated from each other, each with a door, a single vertical driven shaft through the oven carrying, within each compartment, a horizontal rotary support to carry articles to be baked and extending out from a central substantially cylindrical insulated core within the compartment. Each compartment is independently heated by upper and lower electric heating elements.

The general object of the present invention is to provide simple, safe and economical means for introducing steam into a compartment of an oven of the foregoing general type.

BRIEF DESCRIPTION OF THE INVENTION

The present invention is applied to a baker's oven of the type having a baking compartment with a loading doorway, and containing heating means, normally electrical, and a rotary horizontal support for articles to be baked. In order to introduce steam to the oven compartment as and when required, there is provided a metal body mounted within the upper part of the compartment and heated by its heating means. A passage is formed in the body, and water under pressure is fed into the passage, at least one nozzle leading from the passage and being arranged to direct water in finely divided form or a mist in a direction away from the doorway and towards the direction of rotation of the rotary support, this water being rapidly vaporised by the heat of the compartment. No separate boiler is required, and the steam or water vapour, directed away from the doorway, forms a fairly localised curtain through which the products being baked are carried.

BRIEF DESCRIPTION OF THE DRAWINGS

In the drawings:

FIG. 1 is a cross-sectional view of a compartment of a baker's oven incorporating water injection means according to the invention, FIG. 2 is a sectional view taken along line 2—2 in FIG. 1 and to enlarged scale, FIG. 3 is a sectional view along line 3—3 in FIG. 2, to further enlarged scale, FIG. 4 is a perspective view of the water injecting means withdrawn from the oven compartment, FIG. 5 is a vertical sectional view of part of a baker's oven incorporating water injecting means according to another embodiment of the invention, and FIG. 6 is a sectional view along line 6—6 in FIG. 5.

DETAILED DESCRIPTION OF THE PREFERRED EMBODIMENTS

The invention is applied to a baker's oven of the general type described in the specification of my said copending patent application having a casing 10 with a substantially cylindrical inner wall 11, an outer wall 12 and interposed insulating material 13, the casing being divided by insulated horizontal decks 14 into a number of superimposed compartments 15, each with a loading and unloading doorway 16 and hinged door 17. A vertical drive shaft 18 passes coaxially through all of the oven compartments and is driven by a motor (not shown). The drive shaft has fixed to it, in each of the compartments, a cylindrical core 19 of suitably reinforced sheet material packed with heat insulating material.

Horizontal arms 20 radiating from the lower part of the core 19 to a circular rim 21 carry an annular support tray 22 made up of a number of similar sections of mesh extending between succeeding arms 20 and the core 19 and rim 21, one of these mesh sections being removable, and being omitted from FIG. 1.

Each compartment 15 is individually heated by thermostatically controlled upper heating elements 23 and lower heating elements 24 secured, respectively, under the top, and above the bottom, of the oven compartment, each of the heating elements being of tube-encased type doubled about a small radius bend, the doubled element being curved to a section of a spiral.

Referring now to FIGS. 1, 2, 3 and 4 of the drawings, water injecting means for the production of steam in the oven compartment includes a body 25 which is formed of a metal block of square cross-section, cut away along one corner and having a central passage 26 formed in it from one end to a position near to its other end, a metal pipe 27 being connected to the passage.

A pair of nozzles 28 are engaged in tapped holes leading from one face of the body 25 and communicating with the passage 26. The bore of each nozzle is of considerably lesser diameter than the passage 26, and each nozzle is such that it will eject water as a solid cone of fine spray or mist with an apex angle of about 80°.

The pipe 26 passes closely but rotatably through a centrally apertured screw cap 29.

A water hose 30 is connected to the pipe 26 by way of a solenoid controlled valve 31.

The water injection device is installed in the oven compartment a short distance away from the doorway 16 of the compartment 15 in the direction of rotation of the annular mesh support tray, this direction being indicated by an arrow in FIG. 1. The device is installed removably, for maintenance or repair, by passing the body 25 through an access tube 32 which passes through the oven casing 10, and engaging the inner end of the body in a square bracket 33 secured to and extending down from the top of the compartment, the cut-away edge of the body being uppermost to clear the upper heating elements 23, the screw cap 29 then being screwed onto the threaded outer end of the access tube 32. The nozzles 28 are then directed obliquiely down, at an angle of about 45° to horizontal, away from the doorway 16 and towards the direction of travel of the annular mesh support tray.

A source of water under pressure which may be simply a domestic water supply, is connected to the hose 30.

The oven compartment is heated, prior to baking, to a predetermined temperature, the injector body 25 being likewise heated to the ambient temperature. When steaming is to commence, the solenoid-controlled valve 31 is opened, and water is fed into the passage 26 of the heated body 25 and is ejected from the nozzles 28, effectively clearing their bores, if necessary, of any mineral deposition. With continued inflow of water at relatively low temperature, water vapour or mist is ejected from the nozzles in the form of a curtain inclining downwardly away from the oven compartment doorway and is converted to steam within the heated oven. There is no significant back-flow of steam through the compartment doorway and, owing to the pre-heating of the water in the injector body 25, there will be no significant drop in temperature within the compartment during the fairly brief steaming period, at the end of which the solenoid controlled valve 31 is closed. Moisture of condensation will be collected in a shallow tray 34 placed on the bottom of the compartment, and the evaporation of any such excess moisture will retain the humidity of the interior of the compartment at a desirable level. A suitable timing device may be installed in association with the solenoid-controlled valve 31, so that the valve will be closed automatically at the conclusion of a predetermined steaming period. Since the articles being baked are carried by a rotating support it will not generally be necessary for more than the one injector device to be installed in any compartment. It will be found that articles baked in the oven according to the invention will have a superior glaze and crispness of the crust.

Reference is now made to FIGS. 5 and 6 of the drawings, illustrating a modified form of the invention applied to a baker's oven, wherein at least one of the oven compartments is provided with an annular horizontal lid 40 about the core, the lid being supported by fingers 41 which are vertically movable to lower the lid down onto bread tins, or to lift it clear of the tine. The water injecting device, in this embodiment of the invention, is located to direct water into the oven compartment below the raised lid 40, and in such manner as not to prevent the descent of the lid to its operative position, Below the level of the raised lid 40, a rectangular opening 42 in the inner wall 11 of the oven leads into a housing 43 outwardly of this wall, the housing being triangular in plan view and having one end closed normally by a removable end plate 44. The water injection device includes a body 45 within the housing and removably fixed to this end plate. The body consists of a metal block, a metal pipe 46 passing through the end plate 44 and being connected to a passage (not shown) within the block and communicating with a pair of nozzles 47 screwed into tapped apertures in the body which are at an acute angle. The nozzles are made and arranged to direct water under pressure as cones of fine mist each with an apex angle of about 30°, the axes of the cones being substantially horizontal and directed away from the doorway of the compartment and in the direction of rotation of the annular mesh support 22. As before described, water under pressure is fed to the body from a suitable source and by way of a solenoid controlled valve, and a shallow tray 48 is placed on the bottom of the compartment to receive any condensed water, for humidifying the oven compartment after the water injection has been discontinued.

I claim:

1. A baker's oven comprising an upright baking compartment having a side wall loading door and top and bottom walls, stationary electrical heating elements attached to said top and bottom walls, a horizontal support for bake goods in the lower portion of said compartment, vertical axis rotational drive means for the horizontal support in said compartment, a horizontal radially disposed intermittently operated steam injection unit on the side wall of the compartment above said support and having steam injection nozzle means thereon for directing steam in a direction away from the loading door and along the rotational path of movement of said support, said steam injection unit being disposed within a recess formed in said side wall of said compartment, said side wall being cylindrical and said support for bake goods being annular and being at an elevation below said steam injection unit, and a vertically shiftable horizontal lid in said compartment in superposed relationship with the support for bake goods and adapted to vertically traverse the side wall recess containing the steam injection unit without interfering the latter.

2. A baker's oven comprising an upright baking compartment having a side wall loading door and substantially horizontal heat insulating top and bottom walls, stationary electrical heating elements attached to said top and bottom walls, a vertical shaft in said compartment, a substantially horizontal support for articles to be baked within the lower portion of the compartment and mounted on said shaft, means to drive said shaft for rotating said support, a substantially cylindrical heat insulating core disposed coaxially about the shaft and extending upwardly from said support to a position close to the top of said compartment and rotating with said support, said top and bottom walls being centrally closely engaged about said shaft, and a substantially horizontal radially disposed intermittently operated steam injection unit on the side wall of the compartment above said support and having steam injection nozzle means thereon for directing steam away from the loading door and along the rotational path of movement of said support.

3. A baker's oven as defined in claim 1, and said steam injection unit including an elongated metal body including a horizontal passage and being fixed within the top portion of said compartment above and radially across said support for bake goods, said support being annular and being disposed near the bottom wall of the compartment, and said injection nozzle means comprising spaced oblique axis nozzles on said metal body communicating with the horizontal passage of the metal body and directing steam downwardly at an oblique angle on bake goods moving with the horizontal support.

4. A baker's oven as defined in claim 1, and said steam injection unit being disposed within a recess formed in said side wall of the compartment, said side wall being cylindrical, and said support for bake goods being annular and being at an elevation below said steam injection unit.

5. A baker's oven as defined in claim 4, and a vertically shiftable horizontal lid in said compartment in superposed relationship with the support and adapted to vertically traverse said side wall recess containing the steam injection unit without interfering with the latter.

6. A baker's oven as defined in claim 2, and a shallow drainage tray in the bottom portion of the compartment near and below said substantially horizontal support.

* * * * *